US010662905B2

(12) United States Patent
Dirnberger et al.

(10) Patent No.: US 10,662,905 B2
(45) Date of Patent: May 26, 2020

(54) FLAT AIR FILTER ELEMENT AND AIR FILTER

(71) Applicant: MANN+HUMMEL GmbH, Ludwigsburg (DE)

(72) Inventors: Timo Dirnberger, Marbach (DE); Daniel Schmid, Sachsenheim (DE); Andreas Weber, Freiberg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 16/172,821

(22) Filed: Oct. 28, 2018

(65) Prior Publication Data

US 2019/0063380 A1 Feb. 28, 2019

Related U.S. Application Data

(63) Continuation of application No. PCT/EP2017/059993, filed on Apr. 26, 2017.

(30) Foreign Application Priority Data

Apr. 27, 2016 (DE) .......................... 10 2016 005 088

(51) Int. Cl.
*B01D 46/10* (2006.01)
*F02M 35/024* (2006.01)
(Continued)

(52) U.S. Cl.
CPC ... *F02M 35/02491* (2013.01); *B01D 46/0005* (2013.01); *B01D 46/10* (2013.01);
(Continued)

(58) Field of Classification Search
CPC .......................... B01D 46/4236; B01D 46/10; B01D 46/0005; B01D 2275/206; B01D 2271/02;
(Continued)

(56) References Cited

U.S. PATENT DOCUMENTS 5,569,311 A 10/1996 Oda et al.
5,622,583 A 4/1997 Ernst et al.
(Continued)

FOREIGN PATENT DOCUMENTS

DE 2137309 A1 2/1973
DE 19824506 C1 7/1999
(Continued)

OTHER PUBLICATIONS

Title: BMC Air Filter; Published on Sep. 29, 2019, 4 pages, published on http://www.motosport.com/bmc-air-filter.
(Continued)

*Primary Examiner* — Minh Chau T Pham
(74) *Attorney, Agent, or Firm* — James Hasselbeck

(57) ABSTRACT

A flat air filter element for an air filter has a filter medium of cellulose material and a sealing element extending circumferentially about the filter medium. Sealing element and filter medium have at least one recess at an outer contour of the flat air filter element. The sealing element has a circumferentially extending holding groove to be engaged by a housing part of a filter housing. The filter housing has a housing pot, a housing cover to cover the housing pot, and a closure element for closing the filter housing. The flat air filter element is secured in the closed state of the filter housing by circumferentially clamping the sealing element between housing pot and housing cover. The circumferentially extending holding groove of the sealing element is engaged by housing pot or housing cover. The closure element of the filter housing is arranged in the region of the recess.

25 Claims, 11 Drawing Sheets

(51) Int. Cl.
    *B01D 46/00*         (2006.01)
    *F02M 35/02*       (2006.01)
    *B01D 46/42*         (2006.01)

(52) U.S. Cl.
    CPC ..... *B01D 46/4236* (2013.01); *F02M 35/0203* (2013.01); *F02M 35/02441* (2013.01); *B01D 2271/02* (2013.01); *B01D 2275/206* (2013.01); *B01D 2279/60* (2013.01)

(58) Field of Classification Search
    CPC ......... B01D 2279/60; F02M 35/02491; F02M 35/02441; F02M 35/0203
    USPC ...... 55/385.3, 490, 497, 499, 410, 498, 502, 55/511, 521, 504, 506, DIG. 31; 123/198 E
    See application file for complete search history.

(56) References Cited

U.S. PATENT DOCUMENTS

| | | | |
|---|---|---|---|
| 5,919,122 | A | 7/1999 | Geiger et al. |
| 6,312,489 | B1 | 11/2001 | Ernst et al. |
| 9,308,482 | B2 * | 4/2016 | Kaiser .................... B01D 46/10 |
| 10,343,099 | B2 * | 7/2019 | Kaiser |
| 2008/0107765 | A1 | 5/2008 | Considine |
| 2010/0206172 | A1 | 8/2010 | Weber et al. |
| 2010/0229513 | A1 | 9/2010 | Eisengraeber-Pabst et al. |
| 2011/0232983 | A1 | 9/2011 | Abe et al. |
| 2014/0318092 | A1 * | 10/2014 | Rieger ............... B01D 46/0001 55/511 |
| 2015/0020489 | A1 | 1/2015 | Sudermann et al. |
| 2015/0114191 | A1 | 4/2015 | Roehrig |
| 2016/0074794 | A1 | 3/2016 | Sudermann et al. |
| 2016/0214052 | A1 * | 7/2016 | Moser .................. B01D 46/103 |
| 2016/0263513 | A1 | 9/2016 | Pflueger et al. |
| 2016/0263514 | A1 | 9/2016 | Epli |
| 2018/0361300 | A1 | 12/2018 | Roehrig et al. |

FOREIGN PATENT DOCUMENTS

| | | |
|---|---|---|
| DE | 20310833 U1 | 11/2004 |
| DE | 102004002293 A1 | 7/2005 |
| DE | 202008015078 U1 | 4/2010 |
| DE | 202009000969 U1 | 7/2010 |
| DE | 102011005856 A1 | 5/2012 |
| DE | 102010053200 A1 | 6/2012 |
| DE | 102014015907 A1 | 5/2015 |
| DE | 102014016672 A1 | 5/2015 |
| DE | 102015011660 A1 | 3/2016 |
| DE | 102015011661 A1 | 3/2016 |
| EP | 1144083 B1 | 10/2001 |
| EP | 2644875 A2 | 10/2013 |
| GB | 1367226 A | 9/1974 |
| WO | 2007090778 A1 | 8/2007 |
| WO | 2012095419 A1 | 7/2012 |
| WO | 2015075104 A1 | 5/2015 |
| WO | 2016014549 A1 | 1/2016 |
| WO | 2016038171 A1 | 3/2016 |
| WO | 2016038172 A1 | 3/2016 |
| WO | 2016177553 A1 | 11/2016 |

OTHER PUBLICATIONS

Title: The Anatomy of a DNA High Performance Filter, published on Mar. 26, 2016, 2 pages, published on https://www.dnafilters.com/en/filter-anatomy.

Title: New DNA High Performance Air Filter V-Y10S15-0R for the Yamaha YZF R1 2015, published on May 18, 2015, 3 pages, published on https://www.dnafilters.com/.

* cited by examiner

FLAT AIR FILTER ELEMENT AND AIR FILTER

CROSS-REFERENCE TO RELATED APPLICATIONS

This application is a continuation application of international application No. PCT/EP2017/059993 having an international filing date of 26 Apr. 2017 and designating the United States, the international application claiming a priority date of 27 Apr. 2016 based on prior filed German patent application No. 10 2016 005 088.8, the entire contents of the aforesaid international application and the aforesaid German patent application being incorporated herein by reference.

BACKGROUND OF THE INVENTION

The invention concerns a flat air filter element, in particular for an air filter in the air intake manifold of an internal combustion engine, as well as an air filter.

Air filters are employed in the air intake manifold in internal combustion engines, for example, in motor vehicles, in order to remove contaminants from the combustion air to be supplied to the internal combustion engine. When the combustion air passes through a filter medium of the air filter, a pressure loss occurs which may reduce the power of the internal combustion engine. In order to reduce the pressure loss, a filter surface of the filter element can be enlarged. However, an installation space which is available for the air filter is often greatly limited, for example, in the engine compartment of a motor vehicle, so that the air filter cannot be enlarged sufficiently.

DE 10 2010 053 200 A1 discloses a filter element for an interior filter of an air conditioning or ventilation system that comprises a pentagonal bellows wherein the bellows is comprised of a first rectangular partial bellows and a second quadrangular partial bellows. In this way, the quantity of waste of filter material when manufacturing the pentagonal bellows can be reduced.

DE 203 10 833 U1 discloses a filter insert for installation in a flow channel with a predetermined installation cross section. The filter insert comprises an outer contour which is adapted to the installation cross section of the flow channel, wherein a plastic part is placed onto a bellows in order to adapt the folded bellows to the installation cross section. The bellows can be cut to a trapezoidal shape in order to avoid waste.

EP 1 144 083 B1 shows an air filter for internal combustion engines that comprises a housing with a cover in which a filter insert is inserted. The housing comprises a stay which extends through a cutout in the filter insert between two wall parts of the housing to be reinforced. In this construction, complex sealing measures in the region of the cutouts of the filter insert are required so that the manufacture of the filter insert is made difficult and more expensive. Moreover, there is the risk of damaging the filter insert during installation of the filter insert.

The web page accessible at www.dnafilters.com/en/technology/the-anatomy-of-a-dna-high-performance-filter.html (retrieved on Mar. 21, 2016) describes an air filter insert for motorcycles which comprises a filter medium of oil-impregnated cotton. The filter medium is arranged between two metal mesh layers and within a rim structure of polyurethane wherein a circumferentially extending seal of ethylene vinyl acetate is inserted in the rim structure. The rim structure and the filter medium may have a complex outer circumferential geometry with recesses. A reliable sealing seat in a filter housing cannot be ensured easily with the known air filter element. Also, due to the material composition of the air filter element, a future disposal or recycling of the air filter is made difficult.

SUMMARY OF THE INVENTION

It is therefore the object of the invention to provide an inexpensively producible flat air filter element that makes it possible to accommodate a filter surface as large as possible in a filter housing of a predetermined shape and size and that at the same time ensures a good sealing seat within a filter housing. It is moreover the object of the invention to provide an air filter that comprises a minimal pressure loss and a good acoustic damping behavior without enlarging a size of the air filter in this context.

The object concerning the flat air filter element is solved by a flat air filter element, in particular for an air filter in the air intake manifold of an internal combustion engine, comprising a filter medium of a cellulose material that carries a circumferentially extending sealing element, wherein the sealing element and the filter medium comprise at least one recess at an outer contour of the flat air filter element, and wherein at the sealing element a circumferentially extending holding groove for engagement by a housing part of a filter housing is formed.

The object concerning the air filter is solved by an air filter comprising
 a filter housing with a housing pot and with a housing cover as well as a closure element for closing the filter housing, and
 a flat air filter element according to the present invention, arranged in the filter housing,
 wherein the flat air filter element with its sealing element in the closed state of the filter housing is secured circumferentially clamped between the housing pot and the housing cover, wherein the housing pot or the housing cover engages the holding groove of the sealing element, and wherein the closure element of the filter housing is arranged in the region of the recess.

Preferred embodiments of the invention are disclosed in the dependent claims and the description.

The flat air filter element according to the invention is suitable in particular for an air filter in the air intake manifold of an internal combustion engine and comprises a filter medium of cellulose material. Cellulose material has been proven successful in practice as material for air filters, particularly since a good filter performance with minimal pressure loss can be achieved with cellulose material. Moreover, cellulose is inexpensively obtainable and can be disposed of in an environmentally friendly way. The filter medium carries a circumferentially extending sealing element. The sealing element makes it possible to seal the filter medium relative to a filter housing so that no unfiltered air in the sense of a bypass flow can bypass the filter medium. The sealing element and the filter medium comprise at least one recess at an outer contour of the flat air filter element. With the recess, the flat air filter element can be adapted in accordance with the invention to a contour of the filter housing. The flat air filter element therefore must not be made smaller as a whole in order to be able to take into account an inset portion at an inner wall of the filter housing, i.e., a local cross-sectional constriction of the filter housing. Instead, the flat air filter element according to the invention due to the recess of its outer contour can engage around the inset portion at the inner wall of the filter housing and, adjacent to the inset portion, can extend up to the inner wall of the filter housing. The flat air filter element in the region of the recess can comprise, for example, a non-convex outer contour. The aforementioned inset portion of the filter housing may be required, for example, for a closure element of the filter housing. Due to the recess of the filter element, it also possible to create space for other components to be arranged adjacent to the flat air filter element.

The sealing element projects typically by a specified amount, for example, by 0.5 cm to 2 cm, laterally past the filter medium. The recess is preferably formed likewise at the filter medium and at the sealing element so that a uniform projection of the sealing element past the filter medium is obtained.

In accordance with the invention, at the sealing element a circumferentially extending holding groove for engagement by a housing part of a filter housing is formed. In this way, a defined and safe seat of the flat air filter element in the filter housing can be provided. In particular, due to the form fit between the sealing element and the housing part it can be avoided that the sealing element slides out of its clamped position at the filter housing. In this way, the operational safety of the flat air filter element is improved.

The sealing element has preferably a curved outer side. The curved outer side can be embodied opposite to the holding groove at the sealing element. The curved outer side can be engaged around by a further housing part. In this way, the flat air filter element can be clamped even more securely between the housing part and the further housing part and sealed relative to the filter housing.

According to a preferred embodiment of the invention, the recess is provided at a corner region of the flat air filter element. Advantageously, the recess can be in the form of a bevel. In this way, the recess can be particularly easily produced with regard to manufacturing technology.

An advantageous embodiment of the invention is characterized in that the recess is arranged at a lateral edge of the flat air filter element, in particular centrally. It is then possible to provide centrally at the lateral edge a closure element for a filter housing in which the flat air filter element is installed. In this way, a particularly uniform compression of the sealing element between two housing parts of the filter housing can be achieved.

In an advantageous embodiment, it is provided that the recess is embodied as a curved (rounded, concave) indentation. Such a recess can extend particularly closely to an inset portion in the filter housing. Thus, the filter surface of the flat air filter element can be maximized. Also, a rounded indentation can improve the force flow in the region of the recess, in particular through the sealing element.

The recess can have a projecting depth of at least 10 mm, preferably at least 10.5 mm. In other words, the indentation that is formed by the recess can project at least 10 mm deep, preferably at least 10.5 mm, into the sealing element or the filter medium. Also, or alternatively thereto, the inset portion can have a projecting depth of at least 10 mm, preferably at least 10.5 mm. Then, for example, a closure element, in particular a screw or a clamping spring, can be arranged at the filter housing without projecting past the latter. The closure element can be positioned within a housing envelope of the filter housing. Also, it has been found that a particularly beneficial acoustic damping action may result with such a projecting depth for a correspondingly extending housing wall that follows the indentation or the inset portion. Accordingly, a dual benefit of an improved installation space utilization and improved acoustic behavior may result.

The flat air filter element can advantageously comprise several recesses. It is then possible to arrange in particular several closure elements for the filter housing in a space-saving way at the flat air filter element.

Particularly preferred, the filter medium is embodied as a bellows folded in zigzag shape. Accordingly, the flat air filter element can be embodied with a particularly large filter surface. The filter medium can advantageously be cut in the uncoiled state and only thereafter folded to the bellows. This simplifies the manufacture. A laser cutting device can be used preferably for cutting.

In an advantageous further embodiment of the invention, it is provided that the filter medium comprises end edges that are glued together, in particular comprises an end edge bond. In this way, the folds of the bellows can be sealed relative to each other particularly easily and reliably. Preferably, the end edge bond is embodied to be water-resistant in order to ensure a permanent stability of the bond even at high air moisture or in case of water contact of the flat air filter element.

The so-called end edge bond can be produced in that onto a filter medium, in particular unfolded, at least one so-called glue bead is applied. The glue bead is preferably formed of an adhesive, preferably a hot melt adhesive applied in the molten state, for example, of polyamide or polyester. The filter medium can subsequently be folded to the bellows so that neighboring folds of the bellows are connected to each other. Typically, the glue beads or sections of the glue bead of neighboring folds overlap. At the end face of the filter medium, two glue beads or two sections of the glue bead, in particular overlapping or alternatively non-overlapping, can extend toward each other.

The glue bead can extend usually uninterrupted and in particular parallel or substantially parallel to the end edge or to the end edges of the filter medium.

In particular, an end edge bond can extend at least in the region of the recess, preferably along the entire end faces of the flat air filter element, at a tangential angle of at most 45° relative to the main direction of the folded filter medium, i.e., to the end face of the folded filter medium. This means that the curve that is formed by the parts of the end edge bond that are visible in the folded state in the region of the fold tips has maximally an angle of 45° relative to the end face and thus minimally an angle of 45° to the fold edges. In this way, a continuous and preferably continuously seal-tight production of the glue bead and thus of the end edge bond can be facilitated. In this context, main direction refers to the—usually substantially straight extending—orientation or direction of the end edge of the unfolded filter medium forming the end edges, in particular outside of the region of an indentation that forms, for example, the recess. In other words, the main direction results from the direction of the end edge of the unfolded filter medium by ignoring the indentation; this corresponds in general to the machine direction.

The glue bead can extend in particular without a sharp bend. Also, the maximally achieved tangential angle of the glue bead can be selected depending on the width of the glue bead and/or the fold spacing or the fold division of the filter medium.

Conceivable is also to apply several glue beads onto the filter medium, in particular displaced relative to each other. In particular, it is conceivable to provide several end edge bonds for the end edges. Also, it is conceivable to provide, alternatively or in addition, along one or several end edges of the filter medium an end edge seal, for example, embodied as a sealing plate.

The sealing element can adjoin seal-tightly along a seal joining contour the end edge bond in particular by form fit.

This seal joining contour for this purpose can enclose the end edge bond in a form-fitting way. The seal joining contour can project past and/or cover radially (viewed from the outer end face in inward direction), in particular at the clean side, the end edge bond.

Manufacture can further be facilitated when the seal joining contour of the sealing element and the end edge bond extend parallel to each other in the region of the recess, preferably along the entire end faces of the flat air filter element.

Also, it can be provided for this purpose that the sealing element and the end edges extend parallel to each other in the region of the recess, preferably along the entire end faces of the flat air filter element. This enables a uniform manufacture of the sealing element. When the sealing element is produced, for example, by free foaming, uniform foam height can be achieved.

The sealing element and the end edges can extend parallel to each other in the region of the recess, preferably along the entire end faces of the flat air filter element. This also facilitates manufacture.

In this context, it is also conceivable that the sealing element and/or the end edges extend parallel to the end edge bond in the region of the recess, preferably along the entire end faces of the flat air filter element. Likewise, or alternatively, it is conceivable that, in a transition region of the recess, the spacing between the outer contour and the end edge bond and/or between a line of extension of the sealing element and the end edge bond is enlarged relative to the adjoining regions.

In an advantageous embodiment, it is provided that the sealing element is manufactured of polyurethane. Polyurethane can be processed easily and has suitable properties in order to be used as the sealing element. Preferably, the sealing element is injection molded or foamed immediately onto the flat air filter element. In this way, the manufacture of the flat air filter element can be simplified. Moreover, it can be achieved in this way that the sealing element itself is fastened in a seal-tight way on the flat air filter element. As needed, the flat air filter element can thus be comprised of only two different materials, for example, polyurethane and cellulose. This is advantageous in regard to manufacturing costs as well as future reclamation or recycling of the filter element. It is understood that the sealing element can also be attached by means of an adhesive to the filter medium.

The present invention further encompasses an air filter comprising a filter housing and a flat air filter element in accordance with the invention as described above. The filter housing comprises a housing pot and a housing cover. Moreover, a closure element for closing the filter housing is provided. The closure element serves for clamping the housing cover on the housing pot. In the closed state of the filter housing, the flat air filter element is secured with its sealing element by circumferential clamping between the housing pot and the housing cover. In the mounted state of the flat filter element in the filter housing, the sealing element is thus clamped circumferentially between the housing cover and the housing pot. The filter medium is therefore sealed relative to the filter housing. The housing pot or the housing cover engages, in particular with a free rim section, the holding groove of the sealing element. In this way, on the one hand, a defined sealing seat of the flat air filter element in the filter housing can be achieved. Moreover, due to the form fit between the holding groove and the housing pot or the housing cover it can be avoided that the flat air filter element can slide out of the sealing clamped position. This is in particular important in the region of the recess of the flat air filter element. In known filter elements, sliding out of the clamped position can happen, for example, when the filter medium compacts when loaded with water.

The closure element of the filter housing is arranged in the region of the recess. In other words, the closure element—relative to the longitudinal axis of the filter housing—is arranged in a radial direction outside of the recess or engages therein. In this way, a particularly space-saving configuration of the air filter can be achieved. Due to the invention, it is possible to arrange the filter medium closer to the closure element. In particular, the filter medium can engage partially around the closure element. For specified outer dimensions of the filter housing, it is thus possible to provide a particularly large filter surface and a larger housing volume of the filter housing. In this way, the pressure loss of the air upon passing through the air filter can be reduced and the acoustic damping behavior of the air filter can be improved. The closure element can advantageously penetrate through a filter plane of the filter housing which is defined by the flat air filter element. The housing cover and the housing pot are thus pressed against each other by the closure element in the direction of the longitudinal axis of the filter housing, i.e., perpendicular to the filter plane, and cause clamping of the sealing element.

The closure element can be arranged in particular along or substantially along a linear continuation of the sealing element bridging the recess, in particular the sealing surface configured for sealing or main sealing surface. In other words, the closure element can be arranged such that it would be located, ignoring the recess of the sealing element, at the contact surface of the seal, for example, at the outer rim of the sealing element or in the region of a sealing groove, i.e., in continuation of the contact surface of the seal, for example, of the outer rim of the sealing element, that is substantially straight in particular outside of the recess, or in the region of a sealing groove. In this way, the force flow can be improved in particular in the region of the closure element.

The closure element in accordance with the invention can be a snap hook, a screw, or another clamping element, for example, a clamping spring. A clamping spring can be actuated particularly quickly and without tool, which is advantageous when exchanging the flat air filter element. By means of a screw, on the other hand, a particularly safe clamping action of the housing cover and of the housing pot can be achieved. In particular, the strength of the mutual compression can be controlled by a controlled tightening of the screw. A head of the screw is supported in this context preferably at one of the housing parts. A threaded section of the screw can engage directly the other housing part. Alternatively, the threaded section can engage a nut that is supported at the other housing part.

Particularly preferred, the housing cover and the housing pot are connected in the region facing away from the recess by a hinge or by a hook element. The hinge or hook element can be arranged in particular at a housing side of the filter housing that is arranged opposite to the recess of the flat air filter element. Advantageously, then only one closure element is required in order to close the housing pot with the housing cover. Due to the opposite arrangement of the aforementioned components, a uniform compression of the housing parts with the sealing element can moreover be achieved circumferentially.

According to a further embodiment of the invention, the filter housing comprises several closure elements and the flat air filter element comprises a number of recesses corresponding to the number of closure elements. By providing several closure elements, a particularly secure and uniform clamping of the housing parts relative to each other can be achieved. By means of the plurality of recesses, the afore described advantages are maintained, in particular with regard to size of the air filter, size of the filter surface of the filter medium, pressure loss, and acoustic damping behavior.

Further advantages of the invention result from the description and the drawing. The afore described and still further disclosed features can be used in accordance with the invention individually or several combined in any combinations.

DESCRIPTION OF PREFERRED EMBODIMENTS

Figure 1A:
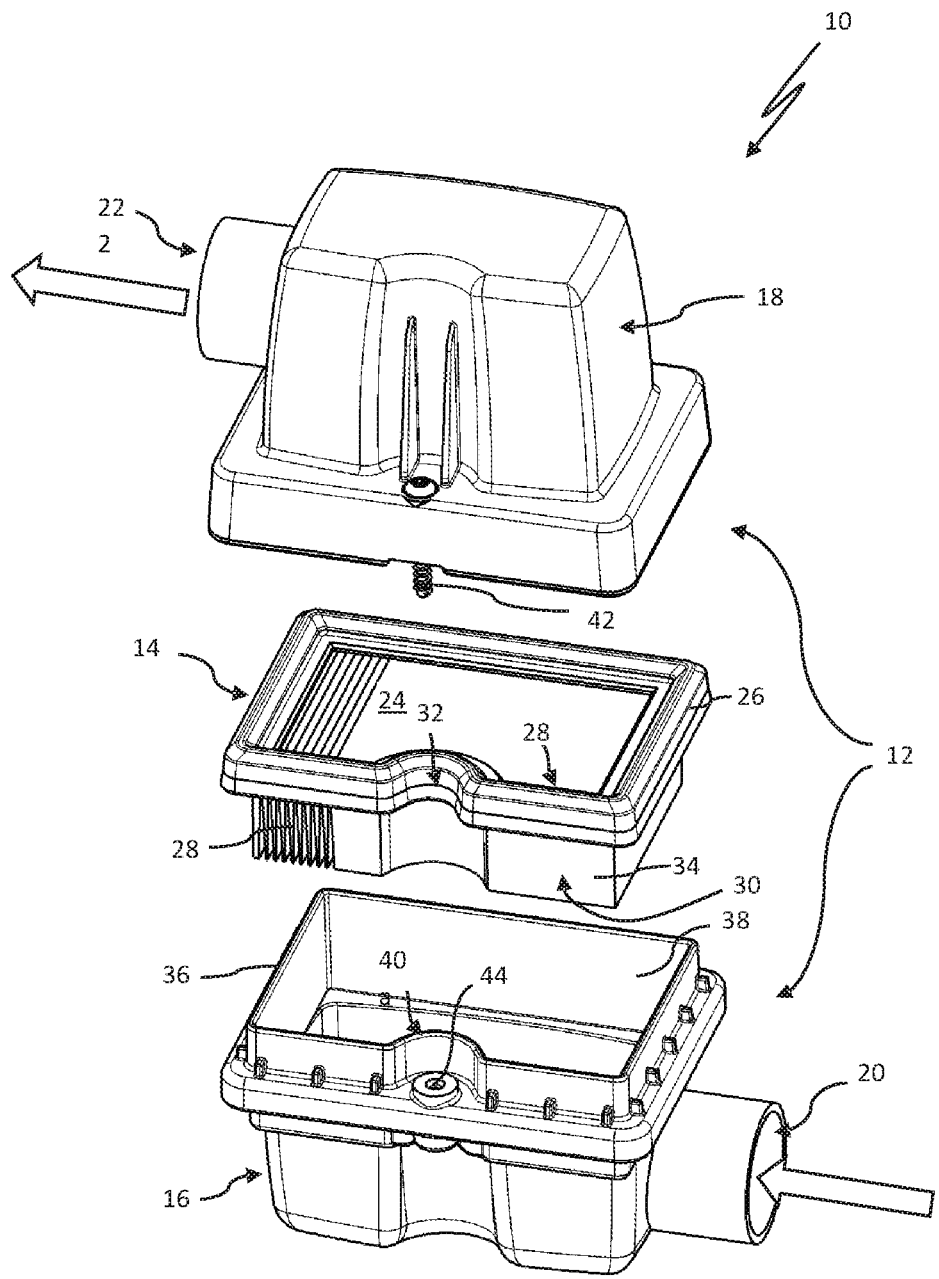
FIG. 1a shows a first embodiment of an air filter with a flat air filter element with an indentation centrally at a lateral edge, in a schematic exploded illustration.

FIG. 1a shows a first embodiment of an air filter 10 according to the invention with a filter housing 12 and with a flat air filter element 14 in a schematic exploded illustration. The filter housing 12 comprises a housing pot 16 and a housing cover 18. An inlet of the filter housing for the air to be filtered is identified at 20 and an outlet of the filter housing 12 is identified at 22. The flat air filter element 14 can be arranged between the housing pot 16 and the housing cover 18.

The flat air filter element 14 comprises a filter medium 24 and a sealing element 26 which is arranged circumferentially extending at the filter medium 24. The filter medium 24 is comprised of a cellulose material. The filter medium 24 is folded in a zigzag shape and is in the form of a bellows. Preferably the filter medium 24 is cut before it is folded to the bellows. The filter medium comprises end edges 28 which are preferably glued together in a water-resistant way; in particular, an end edge bond is formed in this way. The sealing element 26 is arranged here at the topside at the filter medium 24. The sealing element 26 can be in particular injection molded or foamed onto the filter medium 24. Insofar, the sealing element 26 can be comprised, for example, of a polyurethane (PU), preferably a PU foam.

The flat air filter element 14 comprises a recess 32 at its outer contour 30. The recess 32 is formed here centrally at a lateral edge 34 of the flat air filter element 14. The recess 32 is embodied here as a curved indentation. The indentation is embodied here of a semicircular rounded shape. The indentation can be embodied concave at the flat air filter element 14 and point inwardly. The recess 32 can be embodied at the filter medium 24 and the sealing element 26 in the same shape so that the sealing element 26 projects everywhere to the same extent past the filter medium 24.

At the top side, the housing pot 16 can have a circumferentially extending free rim section 36. The circumferentially extending rim section 36 forms here a top end of an inner wall 38 of the housing pot 16. The inner wall 38 and the circumferentially extending rim section 36 have at the top an inset portion 40. The inset portion 40 can be embodied in particular corresponding to the recess 32 of the flat air filter element 14. A closure element 42 embodied as a screw for the housing cover 18 and the housing pot 16 is arranged at the housing cover 18. The screw can penetrate through the housing cover 18. A cutout 44 for engagement by the screw 42 is formed at the housing pot 16. The cutout 44 is formed outside of the free rim section 36 in the region of the inset portion 40 at the housing pot 16.

Figure 1B:
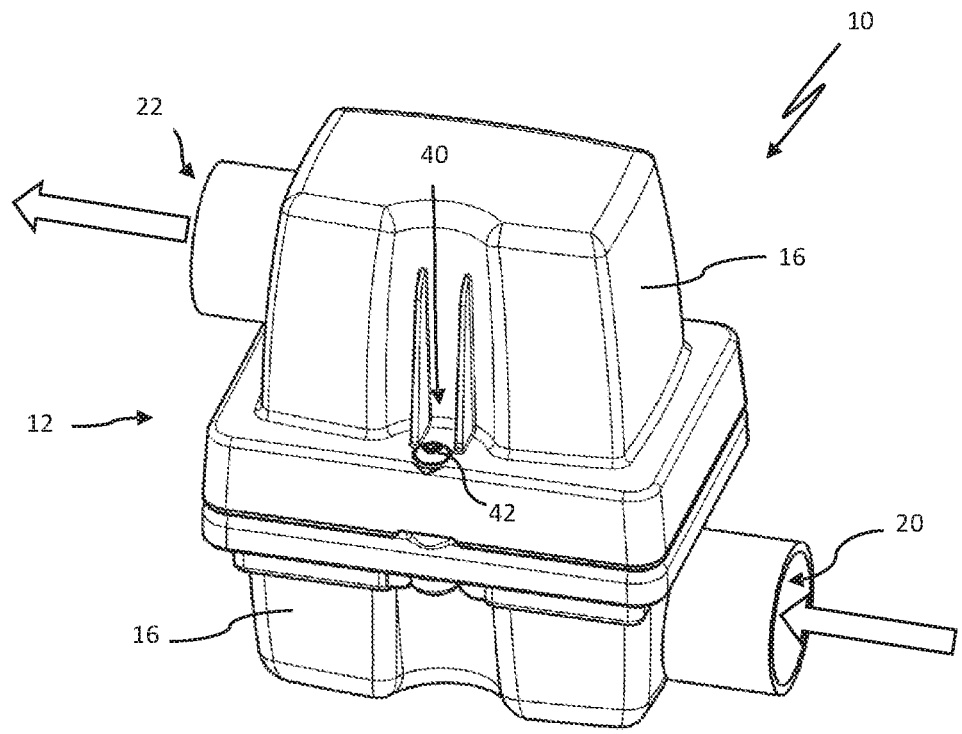
FIG. 1b shows the air filter according to FIG. 1a in a schematic perspective view.
Figure 1C:
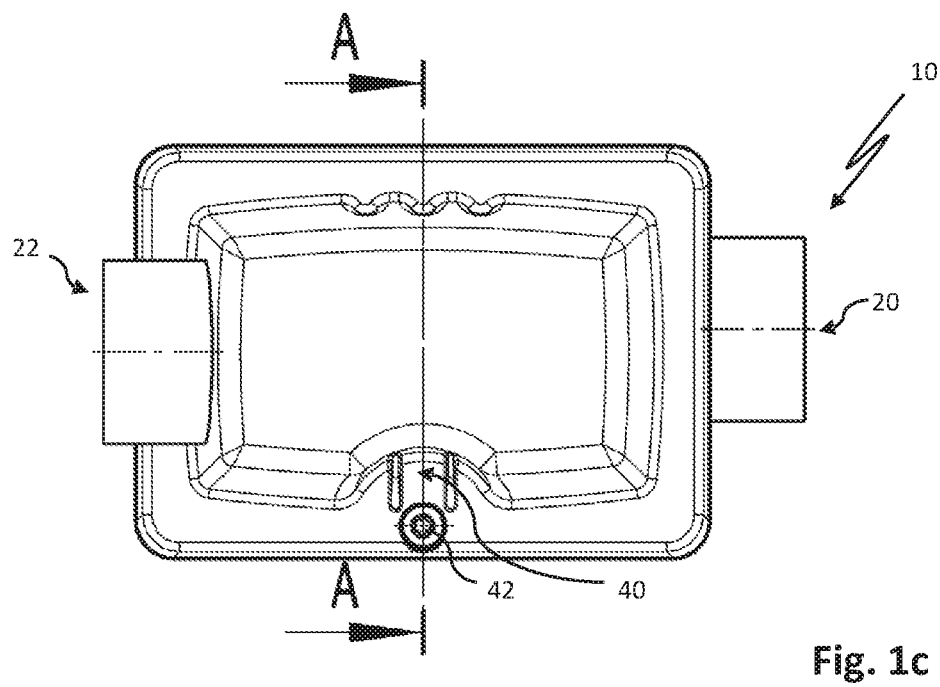
FIG. 1c shows the air filter according to FIG. 1a in a schematic plan view.

FIG. 1b shows the air filter 10 according to FIG. 1a with closed filter housing 12 in a perspective view. The housing pot 16 and the housing cover 18 are clamped against each other by the closure element 42. In FIG. 1c, the air filter 10 is shown in a plan view. An inset portion 40 is also formed at the housing cover 18. The screw can be arranged externally in the region of the inset portion 40.

Figure 1D:
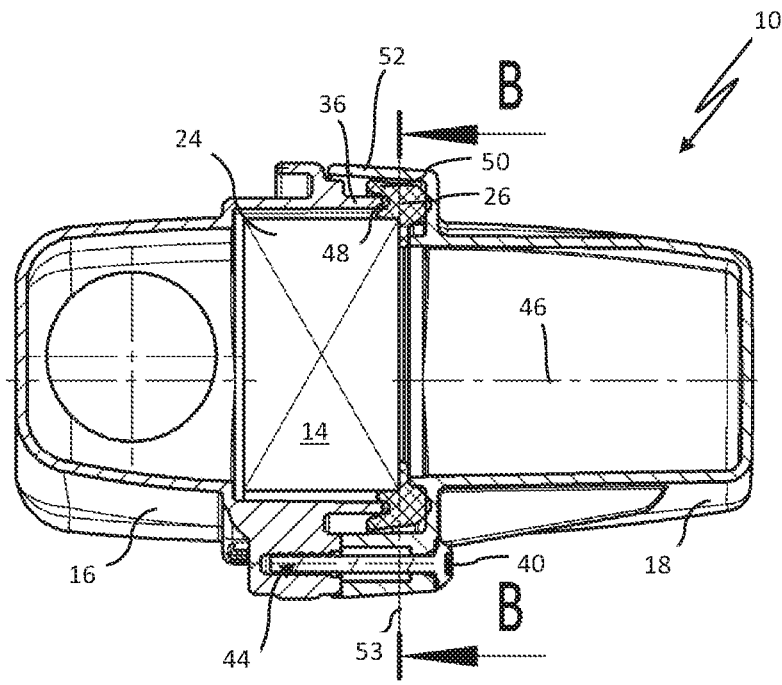
FIG. 1d shows the air filter according to FIG. 1a in a schematic cross section along the section plane indicated in FIG. 1c at A-A.

FIG. 1d shows the air filter 10 according to FIG. 1a in a schematic cross section along the section plane indicated by A-A in FIG. 1c in the mounted state. The flat air filter element 14 is arranged in the filter housing 12. The sealing element 26 extends in a radial direction relative to the longitudinal axis 46 of the filter housing 12 past the free rim section 36 of the housing pot 16. The free rim section 36 of the housing pot 16 engages circumferentially a holding groove 48 of the sealing element 26. In accordance with an embodiment not illustrated in detail, the holding groove 46 can also be facing the housing cover 18. The sealing element 26 of the flat air filter element 14 is thus circumferentially secured by clamping between the housing pot 16, here its free rim section 36, and the housing cover 18 in an axial direction relative to the longitudinal axis 46 of the filter housing 12. The sealing element 26 can moreover be designed with its free end section 50 such that the latter in addition is contacting in radial direction seal-tightly an annular collar 52 of the housing cover 18. The sealing element 26 in this special case is thus embodied as a combined radial and axial sealing element.

The annular collar 52 engages externally around the housing pot 16. The sealing element 26 of the flat air filter element 14, due to the engagement of the housing in the holding groove 48, is circumferentially positionally secured in radial direction reliably between the two housing parts, in particular also in the region of the recess 32. In this way, even in filter operation with inflow at the flat air filter element, i.e., a radially oriented tensile load of the sealing element 26, a reliable sealing seat of the flat air filter element 14 in the filter housing 12 is ensured. In order to connect the housing pot 16 and the housing cover 18 at a side of the filter housing 12 opposite the closure element 42, a hook element (hidden) can be formed at one of the housing parts 16, 18. In this context, the hook element engages preferably a corresponding hook cutout (hidden) of the other housing part 16, 18.

Figure 1E:
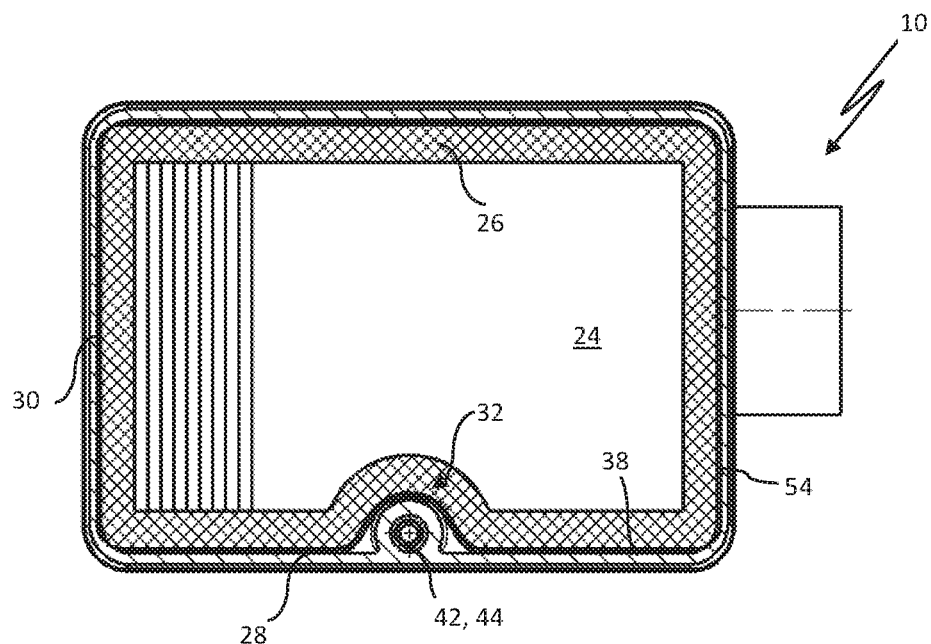
FIG. 1e shows the air filter according to FIG. 1a in a schematic horizontal section along the section plane indicated in FIG. 1d with B-B.

FIG. 1e shows the air filter 10 in a horizontal section along the section plane which is identified in FIG. 1d by B-B.

Figure 2:
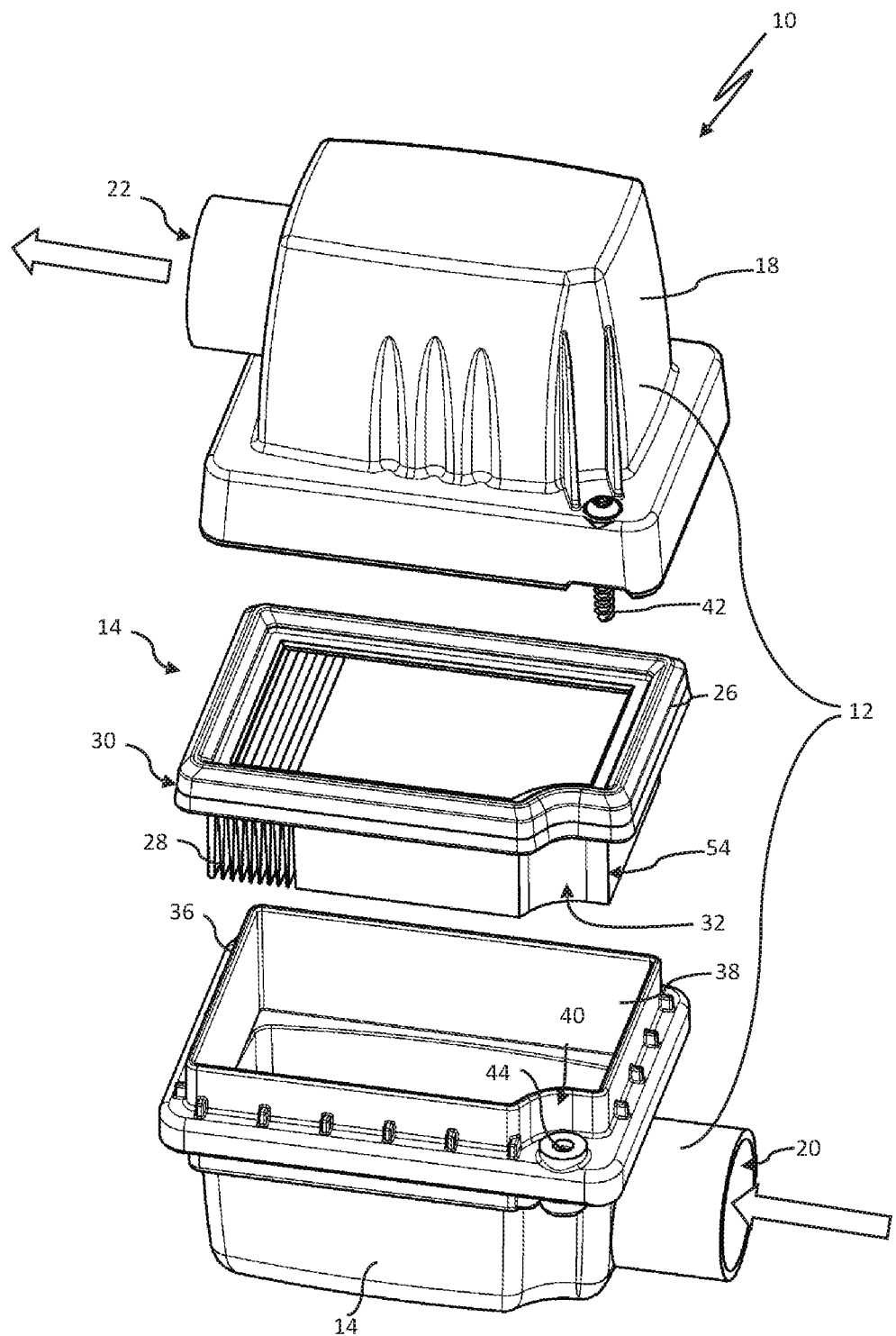
FIG. 2 shows a second embodiment of an air filter with a flat air filter element with a recess in a corner area, in a schematic exploded illustration.

FIG. 2 shows a second embodiment of an air filter 10 with a flat air filter element 14 in an exploded illustration of its parts. The air filter 10 differs from the air filter 10 described above in connection with FIGS. 1a to 1e substantially in that the recess 32 is embodied in a corner area 54 of the flat air filter element 14. The recess 32 can be in particular embodied as an inwardly curved concave indentation of the outer contour 30 of the flat air filter element 14. As a closure element 42, a screw can be arranged in the region of the recess 32.

Figure 3:
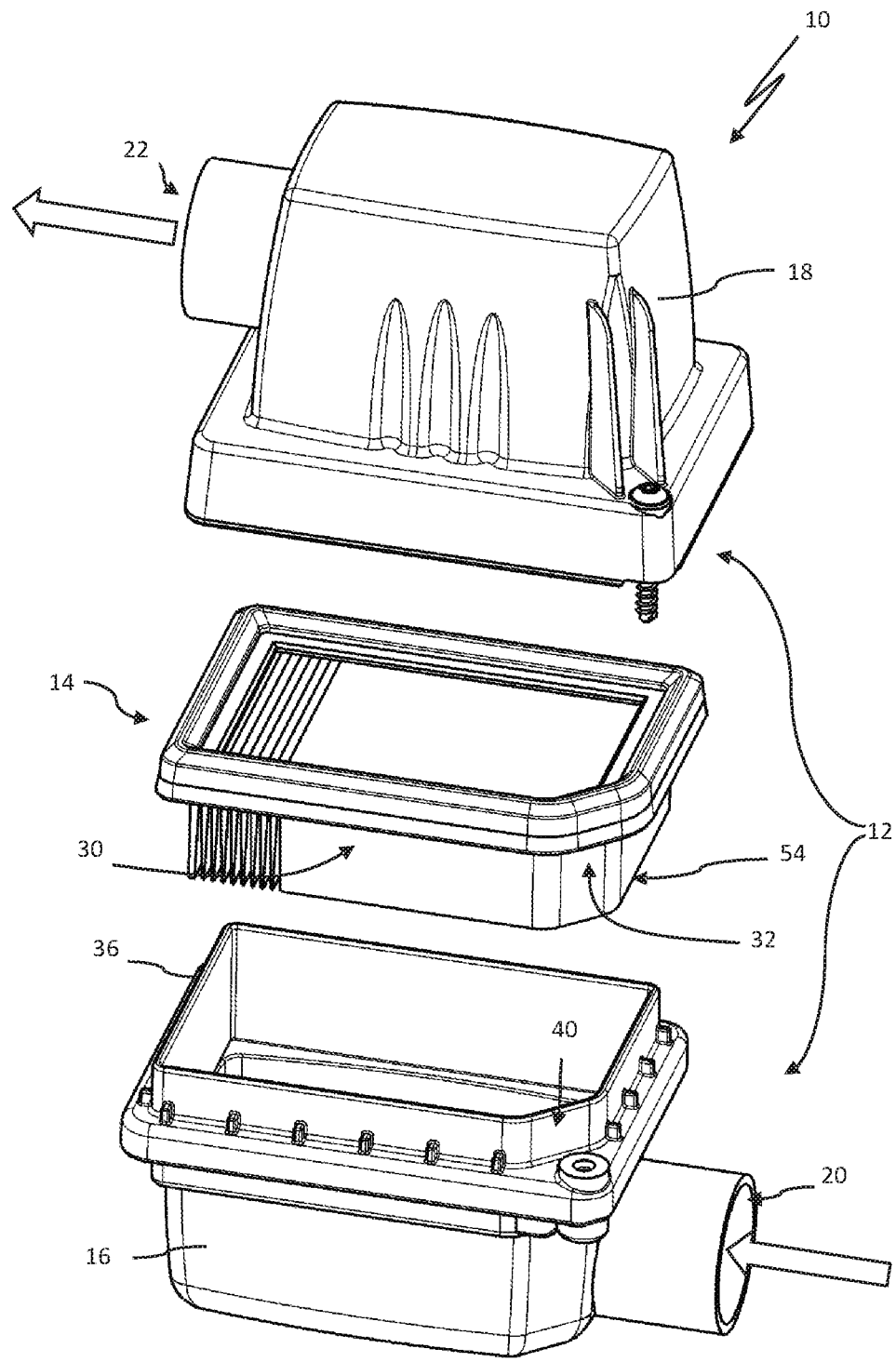
FIG. 3 shows a third embodiment of an air filter with a flat air filter element with a bevel in a schematic exploded illustration.

FIG. 3 shows a third embodiment of an air filter 10 is an exploded illustration of its parts. The third embodiment corresponds in its configuration substantially to the second embodiment according to FIG. 2. A recess 32 at the corner area 54 of the flat air filter element 14 is here embodied as a bevel. The rim section 36 of the housing pot 16 can have an inset portion 40 which is adapted to the shape of the bevel.

Figure 4A:
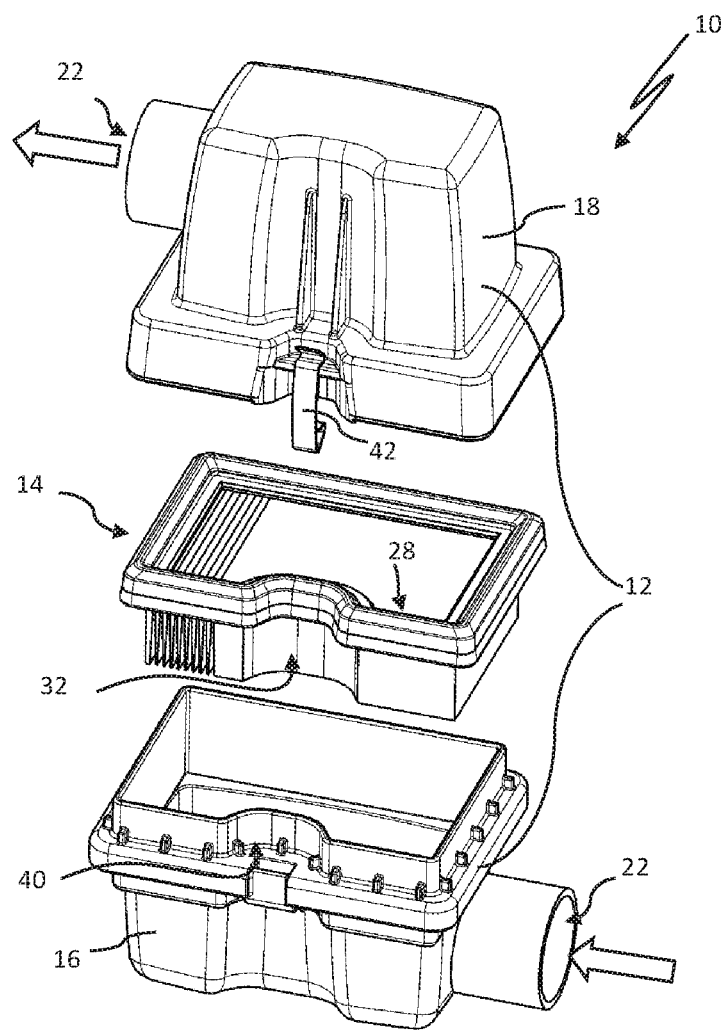
FIG. 4a shows a fourth embodiment of an air filter with a flat air filter element with a recess at a lateral edge and a clamping spring as closure element in a schematic exploded illustration.

FIG. 4a shows a fourth embodiment of an air filter 10 in an exploded illustration. As a closure element 42, a clamping spring is provided here. The recess 32 is centrally formed at a lateral edge 34 of the flat air filter element 14. The recess 32 can be wider than deep, in particular at least twice as wide as deep.

Figure 4B:
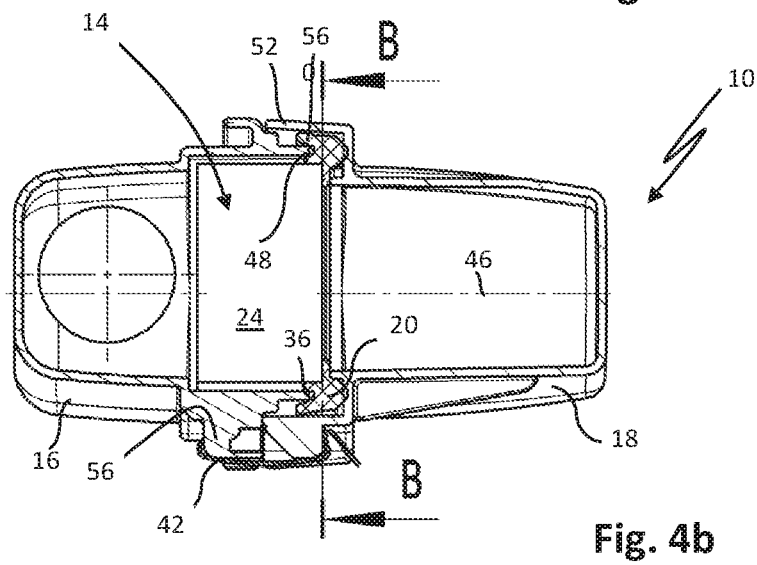
FIG. 4b shows the air filter according to FIG. 4a in a schematic cross section view.

FIG. 4b shows the air filter 10 according to FIG. 4a in a cross section view at the level of the recess 32 and the clamping spring. The clamping spring engages around a lateral projection 56 of the housing pot 16 and the annular collar 52 of the housing cover 18. The clamping spring can be elastically expanded in this context. In this way, the housing pot 16 and the housing cover 18 can be clamped against each other. In this context, the sealing element 26 of the flat air filter element 14 is clamped circumferentially between the housing pot 16 and the housing cover 18. The sealing element 26 comprises the holding groove 48 that is engaged by the free rim section of the housing pot 16.

Figure 5:
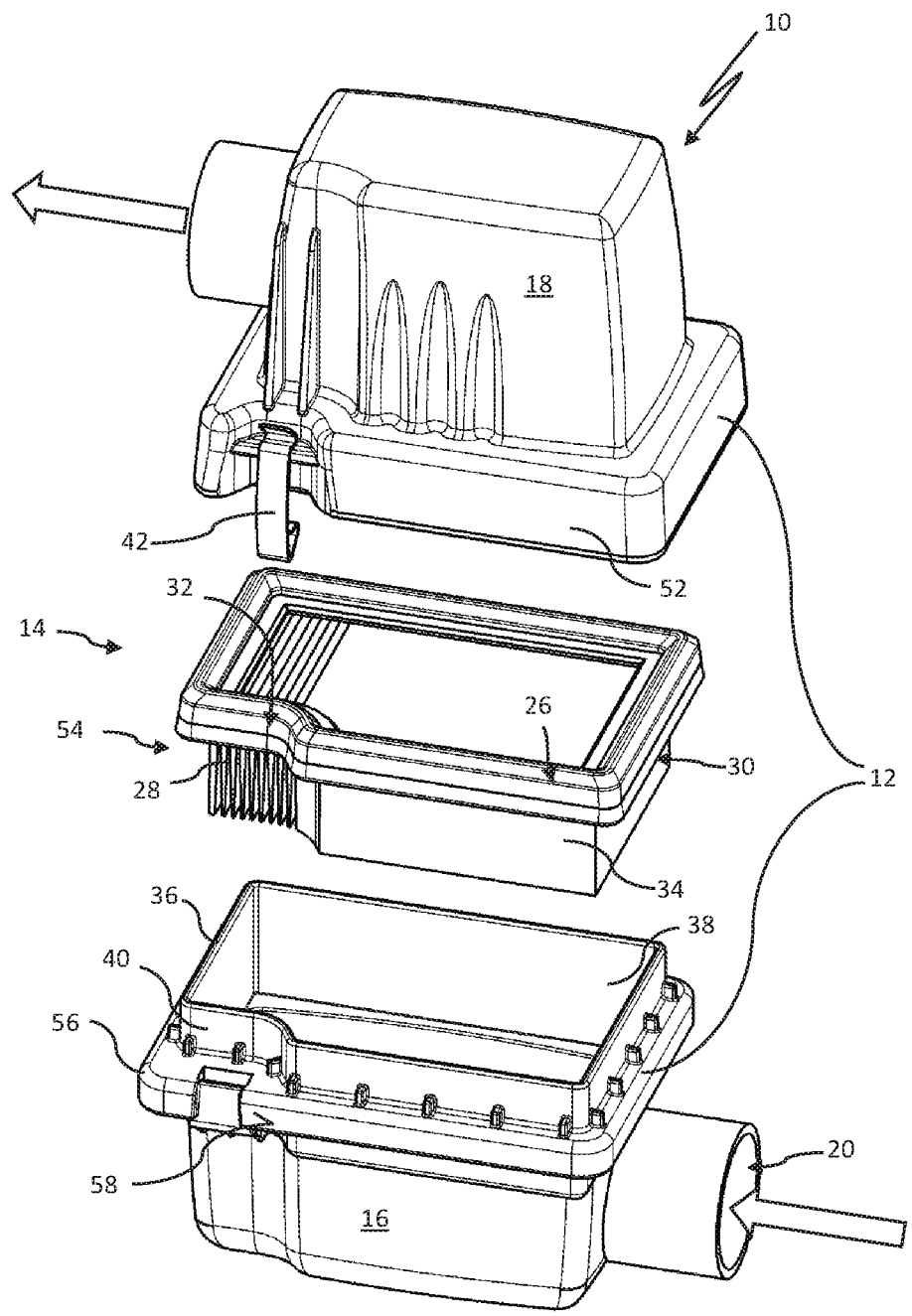
FIG. 5 shows a fifth embodiment of an air filter with a clamping spring in a corner area and with a flat air filter element according to the invention in a schematic exploded illustration.

FIG. 5 shows a fifth embodiment of an air filter 10 in an exploded illustration in which a clamping spring serves as a closure element 42. The recess 32 of the flat air filter element 14 is formed in a corner region 54. The recess 32 can be embodied with a parallel displacement to a lateral edge 34 of the flat air filter element 14. For closing the housing pot 16 with the housing cover 18, the clamping spring can be guided along the recess 32. In this way, it can be avoided that the closure element 42 projects laterally past an outer rim 58 of the housing pot 16.

Figure 6A:
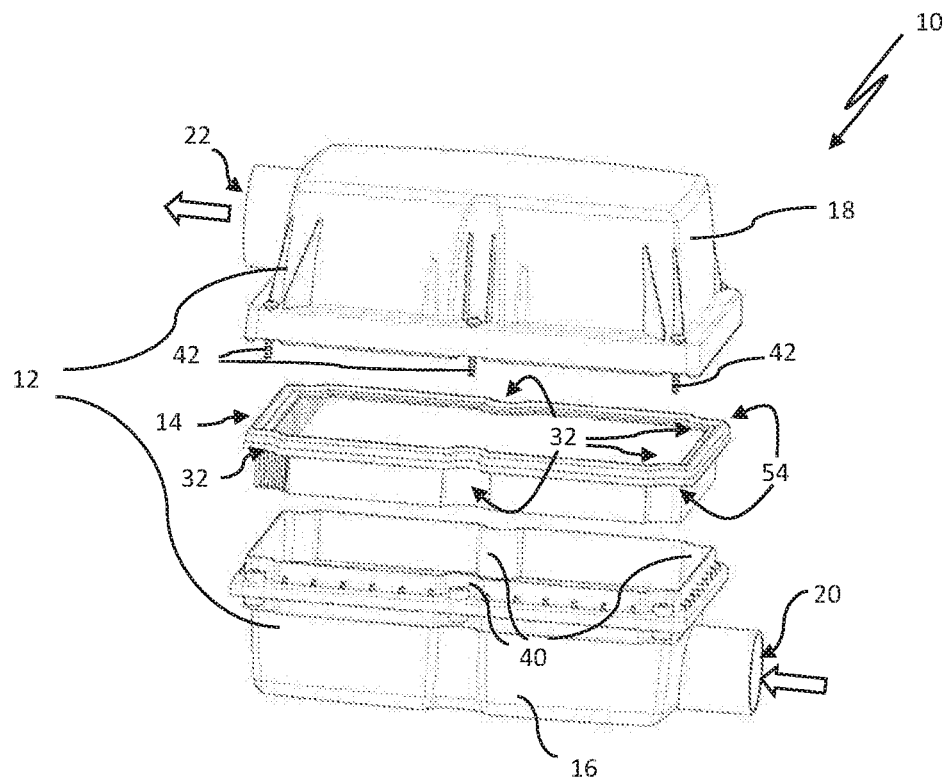
FIG. 6a shows a sixth embodiment of an air filter with several closure elements and with a flat air filter element according to the invention with several recesses in a schematic exploded illustration.

FIG. 6a shows a sixth embodiment of an air filter 10 in which the flat air filter element 14 is embodied with a plurality, here as an example six, recesses 32. The recesses 32 can be provided in corner areas 54 and at lateral edges 34, for example, centrally. For attachment of the housing cover 18 at the housing pot 16, the air filter 10 may comprise a plurality of closure elements 42. The closure elements 42 can be in the form of screws or clamping springs or the like.

Figure 6B:
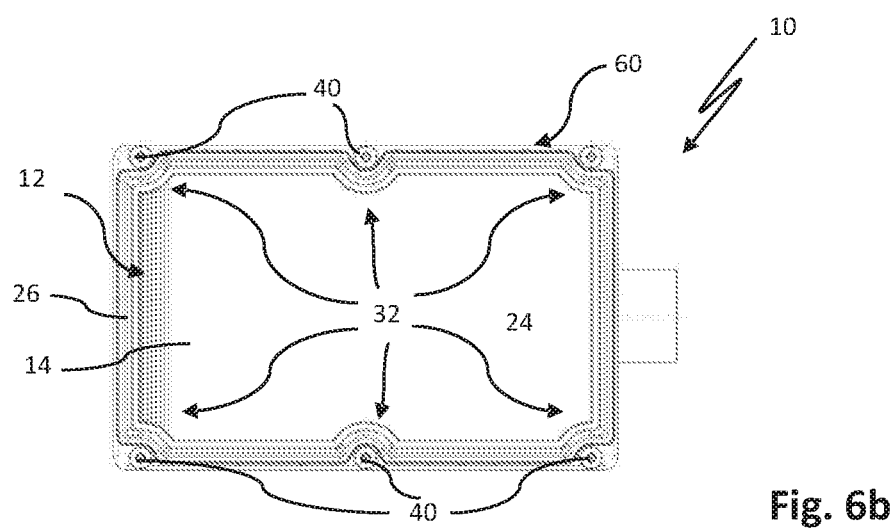
FIG. 6b shows the air filter of FIG. 6a in a schematic view with removed housing cover.

FIG. 6b shows the air filter 10 according to FIG. 6a in a schematic view with removed housing cover. The closure elements 42 are arranged in the region of the recesses 32. The closure elements 42 are thus engaged around by a sealing element 26 of the flat air filter element 14 in the region of the recesses 32. It is therefore possible to realize a substantially rectangular contour line or outer shape 60 of the air filter 10 in plan view, wherein the flat air filter element 14 with its sealing element 26 and the filter medium 24 extends close to the outer shape 60. In particular, the sealing element 26 can be arranged in the regions between the closure elements 42 in order to enlarge a filter surface of the filter medium 24.

Figure 7A:
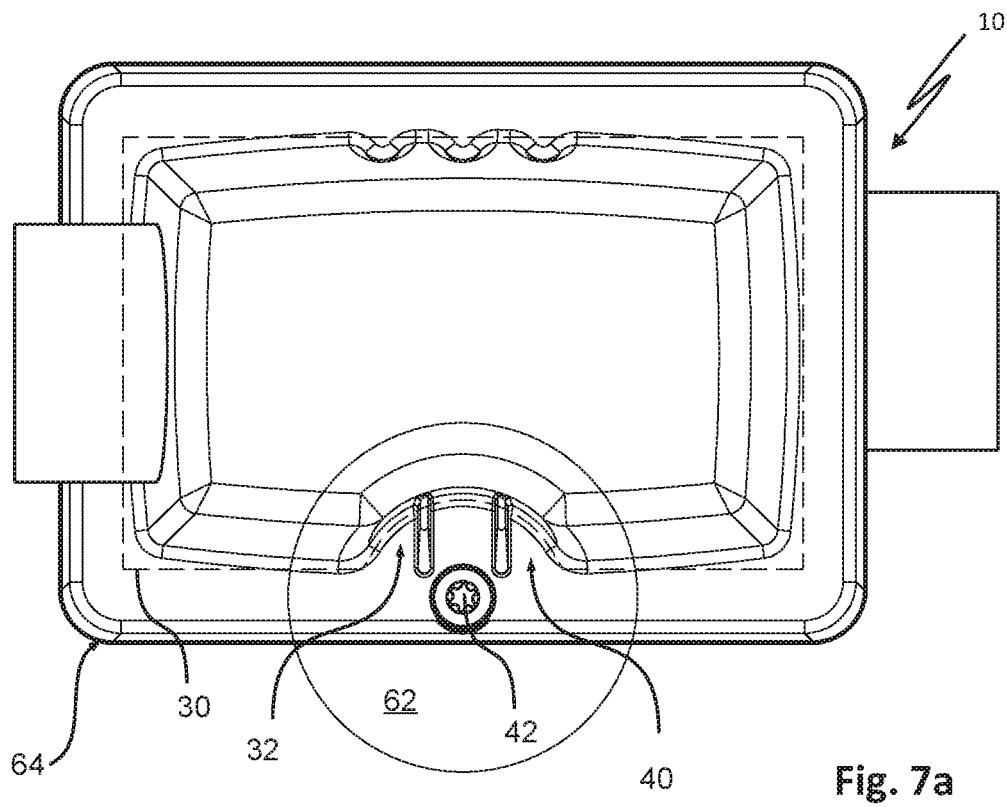
FIG. 7a shows a seventh embodiment of an air filter in plan view.

FIG. 7a shows a plan view of a seventh embodiment of an air filter 10 with a closure element 42 which is arranged in the region of an inset portion 40 or a recess 32. This embodiment, insofar as not described differently, can correspond, for example, to the embodiment of the air filter 10 of FIG. 1a, in particular according to the illustration of FIG. 1c. In particular the outer contour 30 along the filter medium 24 (FIG. 1a), thus the extension of the end edges 28 (FIG. 1a), is illustrated in dashed lines. Moreover, a rim 64 of the air filter 10 can be seen.

Figure 7B:
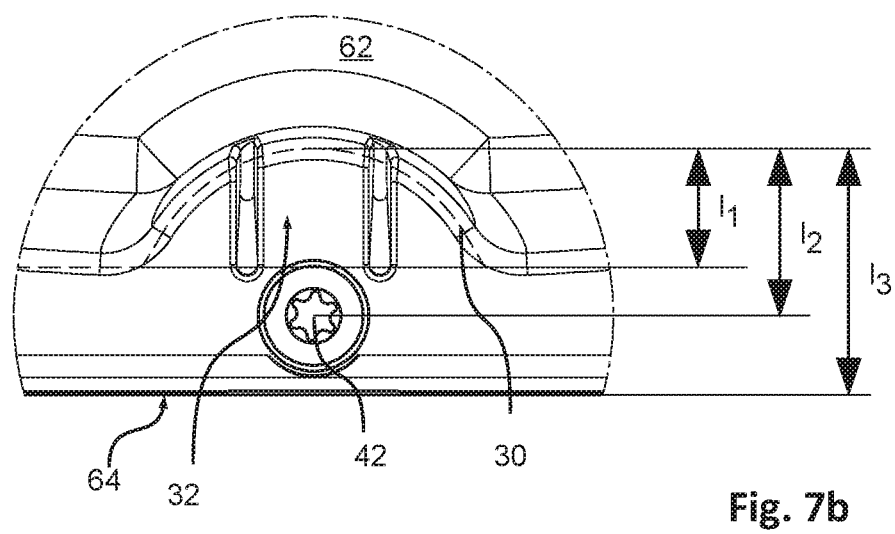
FIG. 7b shows a region with a recess of the air filter of FIG. 7a in enlarged view.

FIG. 7b shows a region 62 with the recess 32 of the air filter 10 of FIG. 7a in enlarged view. Accordingly, the recess 32 projects with a projecting depth $I_1$, measured as a distance of the innermost point in radial direction of the outer contour 30 of the filter medium 24 relative to the outer contour 30 outside of the region of the recess 32, into the flat air filter element 14 (FIG. 1a). In this embodiment, the penetration depth $I_1$ is at least 10 mm or 10.5 mm, in particular approximately 10.8 mm. The center point of the closure element 42 is spaced from this innermost point by a distance $I_2$, in this embodiment approximately 15 mm.

Figure 7C:
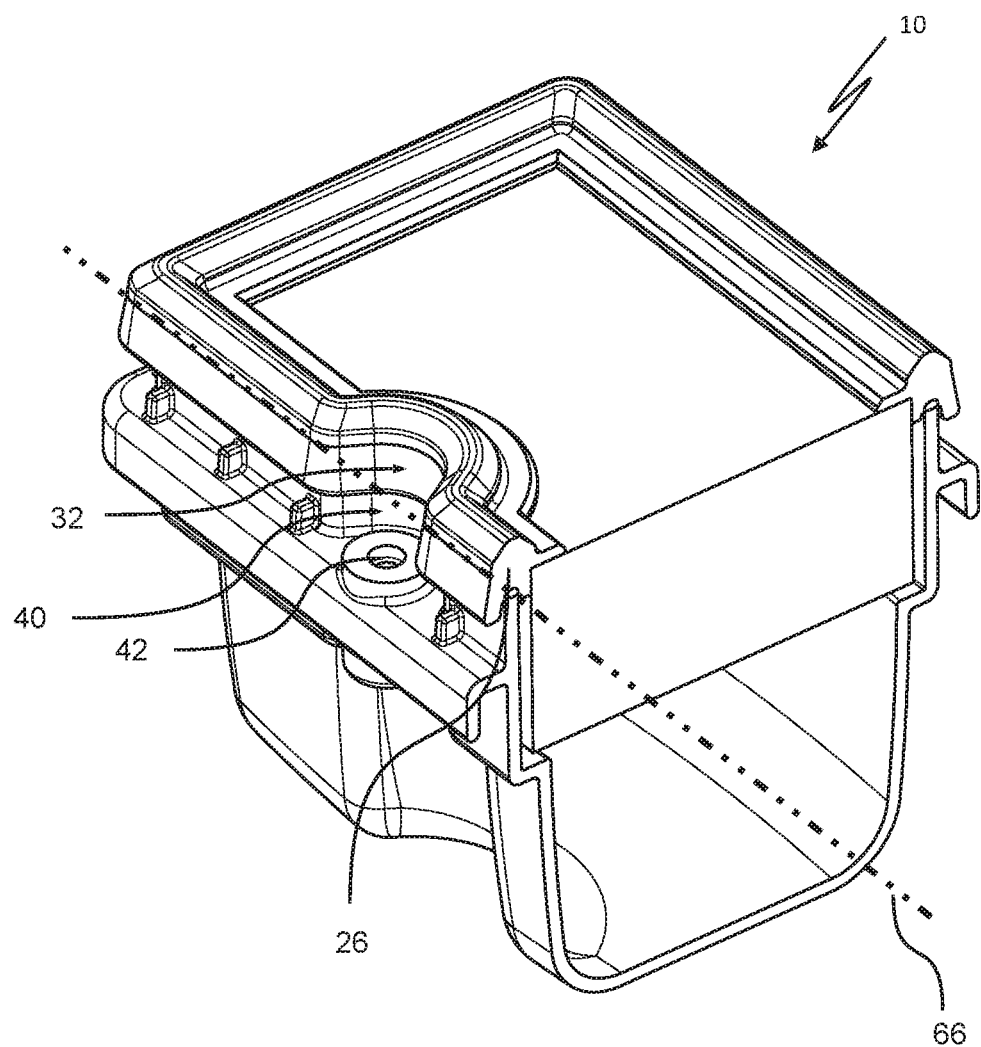
FIG. 7c shows the air filter of FIG. 7a without housing cover in perspective illustration sectioned perpendicular to the end faces of the bellows.

Moreover, the innermost point in this embodiment is spaced from the rim 64 at a distance $I_3$, in this embodiment approximately 22 mm As can be seen in the perspective illustration of FIG. 7c of the air filter 10 of FIG. 7a, here without housing cover 18 (FIG. 1a), in this embodiment the closure element 42 is arranged along an imaginary linear extension 66, bridging the recess 32 and in particular also the inset portion 40, of the sealing element 26, in particular, as shown here, of the sealing groove-shaped main sealing surface which encloses the housing edge.

Figure 8A:
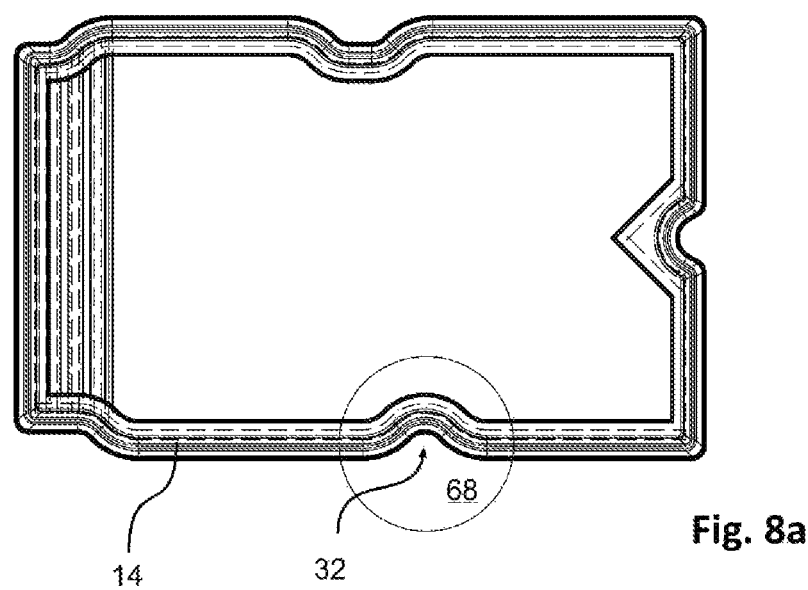
FIG. 8a shows an alternative flat air filter element in schematic plan view.
Figure 8B:
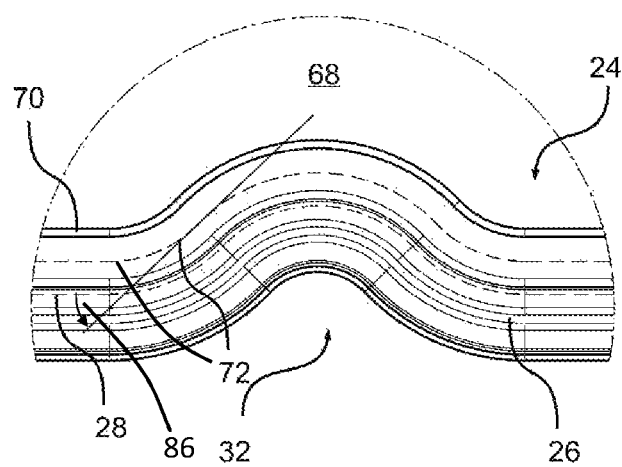
FIG. 8b shows a region with a recess of the flat air filter element of FIG. 7a in enlarged view.

FIG. 8a shows an alternative flat air filter element 14 with a recess 32 provided in a region 68 in schematic plan view wherein the region 68 is in turn illustrated in greater detail in FIG. 8b.

As can be seen in particular in FIG. 8b, the sealing element 26 adjoins a filter medium 24 of the flat air filter element 14 which is embodied as a bellows. The filter medium 24 comprises an end edge bond 72 (schematically illustrated in FIG. 8b) through which the individual folds of the bellows are seal-tightly connected to each other. The end edge bond 72 extends in a rim area of the filter medium 24, in particular spaced apart from the end edges 28.

The sealing element 26 is seal-tightly joined to the filter medium 24 by means of a seal joining contour 70. In particular, the seal joining contour 70 encloses the filter medium 24 seal-tightly with form fit. For this purpose, it projects past the latter at the clean side. The seal joining contour 70 in this embodiment is preferably produced of foam material, for example, of polyurethane.

It can be seen that the seal joining contour 70, the end edge bond 72, and in this embodiment also the end edges 28 extend parallel to each other, in particular in the region of the recess 32. In the region of the recess 32, the sealing element 26 and the end edges 28 extend also parallel to each other.

Accordingly, in this embodiment the seal joining contour 70, the end edge bond 72, the end edges 28, and the sealing element 26 extend parallel to each other in the region of the recess 32.

Figure 8C:
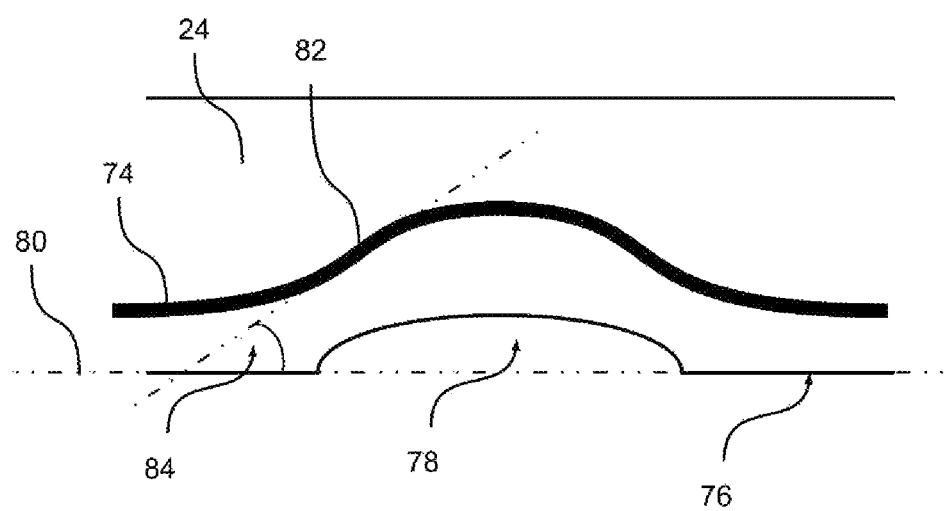
FIG. 8c shows a schematic illustration of the course of a glue bead along an unfolded filter medium.

FIG. 8c shows in schematic illustration the course of a glue bead 74 on a (still) unfolded filter medium 24. For illustrative reasons, only a detail, in particular a rim area, of the filter medium 24 is illustrated in this context.

The glue bead 74 extends in this embodiment in particular without sharp bend in the rim area of the filter medium 24. It follows substantially an end edge 76 of the filter medium 24 wherein, in an exemplary fashion, it is displaced relative thereto into the inner region of the filter medium 24.

In this embodiment, the (unfolded) filter medium 24 has an indentation 78 from which a recess 32 is produced later on by folding. The indentation 78 is also surrounded by the glue bead 74. When ignoring the indentation 78, a main direction 80 results along the end edge 76.

For a point 82 selected as an example along the glue bead 74, FIG. 8c shows the tangential angle 84 which results from the slant of the tangent at the point 82 relative to the main direction 80. It can be seen in particular that the course of the glue bead 74 is selected such that the tangential angle 84 is embodied flat. In particular in the region of the indentation 78, in other words, in the region of the (future) recess 32, the tangential angle 84 is at most 45° but in general at most 30°. For this purpose, in particular in the end regions of the indentation 78 where it bends sharply, the course of the glue bead 74 is not parallel to the indentation.

When the filter medium 24 is now folded, the individual folds can be connected to each other for forming the end edge bond 72 (FIG. 8b). In this context, the extension and width of the glue bead 74 is in particular selected such that respective neighboring sections of the glue bead 74 at least partially overlap. In the folded state, i.e., with erected fold sections connected by the end edge bond 72, the end edge bond 72, preferably at least in the region of the recess, preferably along the entire end faces of the flat air filter element, is embodied to extend at a tangential angle 86 (FIG. 8b) of at most 45° to the main direction of the folded filter medium, i.e., to the end face of the folded filter medium. This means that the curve that is formed by the parts of the end edge bond 72 which are visible in the folded state in the region of the fold tips and whose extension is indicated in FIG. 8b in dashed lines, has maximally an angle 86 of 45° relative to the end face and thus minimally an angle of 45° to the fold edges.

What is claimed is:
1. A flat air filter element comprising:
a filter medium of cellulose material having an inflow face, an opposite outflow face and having an outer contour formed by a plurality of lateral sides which extend from the inflow face to the outflow face, the plurality of lateral sides including a first lateral side and an opposite lateral side;
wherein the filter medium is zig-zag folded forming zig-zag folds, the zig-zag folds extending across the filter medium in a direction from the first lateral side to the opposite lateral side, the zig-zag folds having a first end edge at the first lateral side of the filter medium and a second end edge at the opposite lateral side of the filter medium;
at least one recess formed into a respective one of the first or the second lateral sides of the filter medium such that the end edges of the zig-zag folds at the at least one recess are indented inwardly into the filter medium;
a sealing element arranged at the filter medium and extending circumferentially about the filter medium on the plurality of lateral sides;
wherein the sealing element at the at least one recess is indented inwardly, following the respective lateral side into the recess;
wherein the sealing element comprises
a circumferentially extending holding groove configured to be engaged by a housing part of a filter housing.

2. The flat air filter element according to claim 1, wherein the at least one recess is formed at a corner region of the outer contour of the flat air filter element.

3. The flat air filter element according to claim 2, wherein the at least one recess is a bevel.

4. The flat air filter element according to claim 1, wherein the at least one recess is formed centrally on the respective lateral side.

5. The flat air filter element according to claim 1, wherein the at least one recess is a curved indentation into the respective lateral side of the filter medium.

6. The flat air filter element according to claim 1, wherein the at least one recess has a projecting depth of at least 10 mm.

7. The flat air filter element according to claim 1, wherein the flat air filter element comprises a plurality of said at least one recess.

8. The flat air filter element according to claim 1, wherein the filter medium is a zigzag-folded bellows.

9. The flat air filter element according to claim 1, wherein the end edges at the first lateral side are glued to each other and the end edges at the second lateral side are glued to each other.

10. The flat air filter element according to claim 9, wherein
the filter medium comprises an end edge bond at the end edges.

11. The flat air filter element according to claim 10, wherein
the end edge bond extends at least in a region of the at least one recess at a tangential angle of at most 45° relative to a main direction of the filter medium.

12. The flat air filter element according to claim 11, wherein
the end edge bond extends along the entire end faces of the flat air filter element at the tangential angle of at most 45° relative to the main direction of the filter medium.

13. The flat air filter element according to claim 10, wherein
a seal joining contour of the sealing element and the end edge bond extend parallel to each other in a region of the at least one recess.

14. The flat air filter element according to claim 13, wherein
the seal joining contour of the sealing element and the end edge bond extend parallel to each other along the entire end faces of the flat air filter element.

15. The flat air filter element according to claim 9, wherein
the sealing element and the end edges at the respective lateral side extend parallel to each other in a region of the at least one recess.

16. The flat air filter element according to claim 15, wherein
the sealing element and the end edges extend parallel to each other along the first and the second lateral sides of the filter medium of the flat air filter element.

17. The flat air filter element according to claim 9, wherein
the filter medium comprises an end edge bond,
wherein the sealing element and/or the end edges in a region of the at least one recess extend parallel to the end edge bond.

18. The flat air filter element according to claim 17, wherein
the sealing element and/or the end edges extend parallel to the end edge bond along the entire end faces of the flat air filter element.

19. The flat air filter element according to claim 1, wherein
the sealing element is manufactured of polyurethane.

20. The flat air filter element according to claim 19, wherein
the sealing element is injection molded or foamed onto the filter medium.

21. An air filter comprising:
a filter housing comprising
a housing pot,
a housing cover to cover the housing pot, and
at least one closure element for closing the filter housing;
a flat air filter element arranged in the filter housing, the flat air filter element comprising:
a filter medium of cellulose material having an inflow face, an opposite outflow face and having an outer contour formed by a plurality of lateral sides which extend from the inflow face to the outflow face, the plurality of lateral sides including a first lateral side and an opposite lateral side;
wherein the filter medium is zig-zag folded forming zig-zag folds, the zig-zag folds extending across the filter medium in a direction from the first lateral side to the opposite lateral side, the zig-zag folds having a first end edge at the first lateral side of the filter medium and a second end edge at the opposite lateral side of the filter medium;
at least one recess formed into a respective one of the first or the second lateral sides of the filter medium such that the end edges of the zig-zag folds at the at least one recess are indented inwardly into the filter medium; and
a sealing element arranged at the filter medium and extending circumferentially about the filter medium on the plurality of lateral sides,
wherein the sealing element at the at least one recess is indented inwardly, following the respective lateral side into the recess;
wherein the flat air filter element is secured in the closed state of the filter housing by circumferentially clamping the sealing element between the housing pot and the housing cover;
wherein the sealing element comprises
a circumferentially extending holding groove,
wherein the housing pot or the housing cover engages the holding groove of the sealing element;
wherein the at least one closure element of the filter housing is arranged in a region of the at least one recess.

22. The air filter according to claim 21, wherein
the closure element is arranged along or substantially along a linear continuation of the sealing element,
wherein the linear continuation bridges the at least one recess.

23. The air filter according to claim 21, wherein
the closure element is a clamping spring or a screw or a clamping element.

24. The air filter according to claim 21, wherein
the housing cover and the housing pot, at a housing side facing away from the at least one recess of the flat air filter element, are connected to each other by a hinge or a hook element.

25. The air filter according to claim 21, wherein
the filter housing comprises
a plurality of said at least one closure element,
wherein the flat air filter element comprises
a plurality of said at least one recess,
wherein as many of said closure elements as of said recesses are provided.

* * * * *